United States Patent
Narla

(10) Patent No.: US 9,761,913 B2
(45) Date of Patent: Sep. 12, 2017

(54) HIGH EFFICIENCY HIGH VOLTAGE BATTERY PACK FOR ONSITE POWER GENERATION SYSTEMS

(71) Applicant: SOLARCITY CORPORATION, San Mateo, CA (US)

(72) Inventor: Sandeep Narla, San Jose, CA (US)

(73) Assignee: SOLARCITY CORPORATION, San Mateo, CA (US)

( * ) Notice: Subject to any disclaimer, the term of this patent is extended or adjusted under 35 U.S.C. 154(b) by 168 days.

(21) Appl. No.: 14/931,648

(22) Filed: Nov. 3, 2015

(65) Prior Publication Data
US 2017/0062876 A1 Mar. 2, 2017

Related U.S. Application Data

(60) Provisional application No. 62/210,053, filed on Aug. 26, 2015.

(51) Int. Cl.
*H02H 3/00* (2006.01)
*H01M 10/42* (2006.01)
(Continued)

(52) U.S. Cl.
CPC .......... *H01M 10/425* (2013.01); *H01M 2/34* (2013.01); *H02H 3/08* (2013.01); *H02H 3/087* (2013.01);
(Continued)

(58) Field of Classification Search
USPC .................................................... 361/86–87
See application file for complete search history.

(56) References Cited

U.S. PATENT DOCUMENTS

| | | |
|---|---|---|
| 7,586,214 B2 | 9/2009 | Clarke et al. |
| 2010/0110594 A1 | 5/2010 | Walters et al. |
| | (Continued) | |

FOREIGN PATENT DOCUMENTS

| | | |
|---|---|---|
| DE | 102013204534 | 9/2014 |
| EP | 2 469 572 A1 | 6/2012 |
| | (Continued) | |

OTHER PUBLICATIONS

International Search Report, mailed Feb. 7, 2017, for corresponding International Patent Application, PCT/US2016/044913, 5 pages.
(Continued)

*Primary Examiner* — Danny Nguyen
(74) *Attorney, Agent, or Firm* — Kilpatrick Townsend & Stockton LLP

(57) ABSTRACT

A high-voltage battery pack for an onsite power generation system includes battery modules configured to provide a voltage of at least 170V. High-speed switches and a high-speed current detection circuit are serially coupled between the battery modules and the positive and negative output terminals of the battery pack. A control circuit is operatively coupled to the current detection circuit so that when the current detection circuit detects a fault condition, the control circuit opens one or more of the switches to thereby electrically isolate the battery modules from the positive and negative output terminals of the battery pack. The battery pack is configured so that the at least 170V provided by the battery modules can be provided to an AC stage of the onsite power generation system without an intervening DC/DC converter and/or a transformer.

20 Claims, 5 Drawing Sheets

(51) Int. Cl.
  *H02H 3/087* (2006.01)
  *H01M 2/34* (2006.01)
  *H02H 3/08* (2006.01)
  *H02J 7/00* (2006.01)
  *H02J 7/35* (2006.01)
  *B60L 3/00* (2006.01)

(52) U.S. Cl.
  CPC .............. *H02J 7/0031* (2013.01); *H02J 7/35* (2013.01); *B60L 3/0046* (2013.01); *H01M 2010/4271* (2013.01); *H01M 2220/10* (2013.01); *Y02T 10/7005* (2013.01)

(56) References Cited

U.S. PATENT DOCUMENTS

2014/0118982 A1* 5/2014 Roessler ................. H01M 2/34
                                                             361/807
2014/0333251 A1  11/2014 Lee
2014/0340095 A1  11/2014 Schneider
2016/0339837 A1* 11/2016 Bolduc ................... B60Q 1/46

FOREIGN PATENT DOCUMENTS

| JP | H06255402   | 9/1994 |
| JP | 2002 010517 A | 1/2002 |
| JP | 2015 065770 A | 4/2015 |

OTHER PUBLICATIONS

Written Opinion, mailed Feb. 7, 2017, for corresponding International Patent Application, PCT/US2016/044913, 7 pages.
Blank, Tobias et al. "Design and Construction of a Test Bench to Characterize Efficiency and Reliability of High Voltage Battery Energy Storage Systems", Jul. 2010, 7 pages.

* cited by examiner

HIGH EFFICIENCY HIGH VOLTAGE BATTERY PACK FOR ONSITE POWER GENERATION SYSTEMS

CROSS-REFERENCES TO RELATED APPLICATIONS

This application claims the benefit of priority under 35 U.S.C. §119(e) to U.S. Provisional Application No. 62/210,053, filed Aug. 26, 2015, which is hereby incorporated by reference in its entirety and for all purposes.

FIELD OF THE INVENTION

The invention relates generally to onsite power generation systems, and more specifically to high efficiency battery packs for onsite power generation systems such as photovoltaic systems or for back-up systems.

BACKGROUND OF THE INVENTION

Distributed energy generation, such as solar and wind, are gaining popularity, however, the ability to store that energy at the place of generation (i.e., onsite) is lagging. Storage is necessary in off-grid applications where energy generated onsite is often the only energy available. However, even in grid-tied applications, storage can be important to the overall value proposition of solar for several reasons. First, in jurisdictions that don't enable customers to back feed power to the grid when their generated power exceeds their onsite demand (net metering), storage provides a way to save and use that power later when onsite generation is no longer possible (e.g., after sunset). Second, even in jurisdictions that allow net metering, storage may be useful as a back-up power source during grid outages, and also as a way to help customers and/or utilities shave the peaks off of their power demand curves by discharging storage devices during periods of peak demand.

In the past, the only practical way to store locally generated energy was using deep-cycle lead acid batteries. These batteries are large, heavy and operate at relatively low voltages (e.g., 12-48 volts). Because they are low voltage and very high current battery modules, a transformer must be used to provided galvanic isolation, and a DC/DC buck-boost converter must be used to boost the voltage to a suitable level for inversion to alternating current or to step-down the voltage when charging the battery by rectifying the alternating current. A certain non-trivial percentage of efficiency gets lost during charging and discharging as power losses in the transformer and the DC/DC converter stages.

Recently, higher voltage lithium-ion battery packs that have been developed to provide improved performance over lead-acid batteries within a smaller form factor. These batteries can range in voltage from 48 volts all the way up to 200-800 volts and possibly even higher depending on the cell configuration of the battery modules (i.e., the number of series and parallel groupings of cells). Although they are able to store more energy per unit of mass (energy density) than lead-acid batteries, and also operate at much higher voltages, they still suffer from charging and discharging power losses attributable to the transformer and DC/DC converter stages.

Therefore, there exists a need for techniques to reduce or eliminate efficiency losses associated with battery packs.

BRIEF SUMMARY OF THE INVENTION

This disclosure describes various embodiments that relate to methods and apparatus for improving efficiency and cost of battery packs used in onsite power generation systems, such as photovoltaic power generation systems, or in power backup systems.

In various embodiments, high-voltage battery pack for an onsite power generation system includes battery modules configured to provide a voltage of at least 170V. The battery pack further includes a high-speed current detection circuit and high-speed switches serially coupled between the battery modules and the positive and negative output terminals of the high-voltage battery pack. A control circuit is operatively coupled to the high-speed current detection circuit and the high-speed switches so that when the high-speed current detection circuit detects a fault condition, the control circuit opens one or more of the high-speed switches to thereby electrically isolate the battery modules from one or both of the positive and negative output terminals of the high-voltage battery pack. The high-voltage battery pack is configured so that the at least 170V provided by the battery modules can be provided to an AC stage of the onsite power generation system without an intervening DC/DC converter.

In some embodiments, the high-voltage battery pack is further configured so that the at least 170V provided by the battery modules can be provided to an AC stage of the onsite power generation system without an intervening transformer.

In some embodiments, the high-voltage battery pack further includes a transformer coupled between the positive and negative output terminals of the high-speed voltage battery pack and the serially coupled high-speed current detection circuit and high-speed switches.

In some embodiments, the high-speed current detection circuit includes first and second high-speed current sensors, and the high-speed switches include first and second high-speed switches. The first high-speed current sensor is coupled between the first high-speed switch and a positive terminal of the battery modules, and the second high-speed current sensor is coupled between the second high-speed switch and a negative terminal of the battery modules.

In some embodiments, the high-speed current detection circuit includes first and second high-speed current sensors, and the high-speed switches include first and second high-speed switches. The first high-speed current sensor is coupled between the first high-speed switch and the positive output terminal of the battery pack, and the second high-speed current sensor is coupled between the second high-speed switch and a negative output terminal of the battery pack.

In some embodiments, the control circuit includes a microcontroller configured to generate one or more output signals in response to one or more output signals generated by the high-speed current detection circuit, and he one or more output signals generated by the microcontroller is coupled to control the high-speed switches.

In accordance with various other embodiments, a method of operating a high-voltage battery pack for an onsite power generation system includes the following steps: a voltage of at least 170V generated by battery modules is provided on output terminals of the battery pack; the at least 170V on the output terminals of the battery pack is provided to an AC stage of the onsite power generation system without an intervening DC/DC converter; a fault condition in the battery pack; and in response to the detected fault condition, high-speed switches are opened to electrically isolate the battery modules from the output terminals of the battery pack.

In some embodiments, the fault condition is detected by a high-speed current sensor that is coupled to a controller, and the method of operating the high-voltage battery pack further includes the following steps, a fault signal is generated at an output of the high-speed current sensor in response to the detected fault condition; the fault signal is received at an input of the controller; a control signal is generated at an output of the controller in response to the fault signal; and the control signal is received at an input of one of the high-speed switches.

In some embodiment, the method of operating a high-voltage battery pack further includes providing the at least 170V on the output terminals of the battery pack to an AC stage of the onsite power generation system without an intervening transformer.

In some embodiments, the at least 170V generated by the plurality of modules is provided on the output terminals of the battery pack through a transformer.

In accordance with various other embodiments, an onsite energy storage system includes battery modules, a high-speed current detection circuit, high-speed switches, a DC/DC buck-boost converter, and a control circuit. The high-speed current detection circuit and the high-speed switches are serially coupled between the battery modules and the DC/DC buck-boost converter, and the output of the buck-boost converter provides the positive and negative output terminals of the onsite energy storage system. The control circuit is operatively coupled to the high-speed current detection circuit and the high-speed switches so that when the high-speed current detection circuit detects a fault condition, the control circuit opens one or more of the high-speed switches to thereby electrically isolate the battery modules from one or both of the positive and negative output terminals of the onsite energy storage system. The onsite energy storage system is configured so that a voltage provided by the battery modules boosted by the DC/DC buck-boost converter can be provided to an AC stage of an onsite power generation system without an intervening transformer.

In some embodiments, the control circuit includes a microcontroller that is configured to generate one or more output signals in response to one or more output signals generated by the high-speed current detection circuit. The one or more output signals generated by the microcontroller is coupled to control the high-speed switches.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

In order to facilitate a better understanding of the present disclosure, reference is now made to the accompanying drawings, in which like elements are referenced with like numerals. These drawings should not be construed as limiting the present disclosure, but are intended to be exemplary only.

DETAILED DESCRIPTION OF THE INVENTION

The following description is intended to convey a thorough understanding of the embodiments described by providing a number of specific embodiments of high efficiency battery packs for onsite power generation systems. It should be appreciated, however, that the present invention is not limited to these specific embodiments and details, which are exemplary only.

In accordance with various embodiments, a high-voltage battery pack is disclosed that eliminates the need to step-up the battery voltage when discharging the battery, and also eliminates the need for an internal transformer. However, without the protection of galvanic isolation provided by an internal transformer, steps must be taken to protect the battery pack from over-current or surge-current conditions. In various embodiments, this is accomplished by one or more high-speed switches (such as high-speed relays and solid-state power electronic switches) and high-speed current sensors. The one or more high-speed switches and the high speed current sensors are serially coupled between the internal battery modules and the battery pack's positive and/or negative output terminals. When the high-speed current sensors detect an over-current or a surge-current, indicating a fault condition (e.g., single line or double line fault), a control circuit coupled to the high-speed sensors and the high-speed switches causes the high-speed switches to be temporarily opened in order to protect the battery modules for the duration of the fault condition. In this manner, the efficiency losses as well as the cost associated with the buck-boost converter and the transformer are eliminated while the battery pack remains protected against fault conditions. The battery pack, according to various embodiments of the invention, may be integrated with different types of onsite energy generation systems as well as onsite power backup systems.

Figure 1:
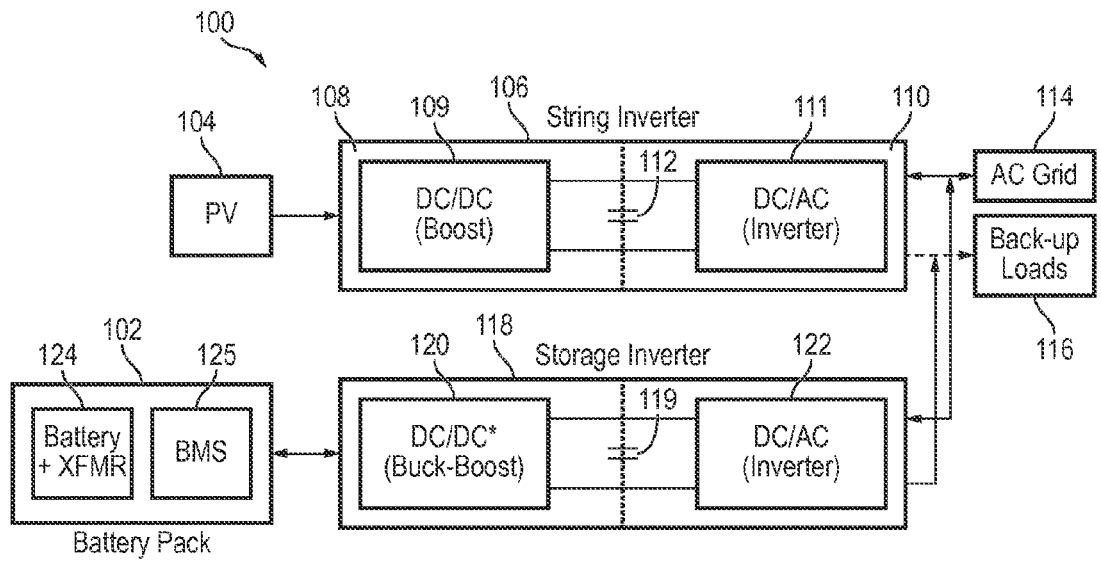
FIG. 1 shows a configuration of an onsite energy generation system with an integrated AC coupled battery pack.

Referring now to FIG. 1, this figure shows a configuration of onsite energy generation system 100 with integrated AC coupled battery pack 102. This configuration could be used in both residential as well as large-scale commercial systems. In system 100, direct current (DC) energy from an array of photovoltaic (PV) modules 104 is supplied as an input to string inverter 106. String inverter 106 includes DC side 108 and AC side 110 that are connected to one another via central capacitor bank 112. DC side 108 may include circuitry for performing maximum power point tracking (MPPT) on PV energy, and DC/DC boost circuitry 109 for boosting the string voltage generated by PV array 104. Alternatively, MPPT may be performed at the PV module level or N-PV module level (where N is an integer between 2 and 40) using DC optimizers. The DC energy on the input could be from fuel cells or any other types of DC energy source.

AC side 110 takes the energy from capacitor bank 112 and converts it to AC current (via DC/AC inverter 111) to supply to AC grid 114. This typically involves synchronizing the voltage and phase of the inverter power to the AC grid interconnection. The AC grid is not limited to single-phase but also applicable to three-phase system (eg., 120 Vac/208 Vac/230 Vac/240 Vac/277 Vac/400 Vac/480 Vac/690 Vac). Also, as shown in FIG. 1, the string inverter's output may also be connected to one or more back-up loads 116 that are also coupled to the AC output of string inverter 106.

In system 100, a so-called storage inverter or bi-directional battery charger 118 is located between the AC output of string inverter 106 and battery pack 102. This arrangement of the battery is called an AC-coupled system because the interface between battery pack 102 and the power sources (e.g., PV array 104 or AC grid 114) is an AC interface.

During battery charging, storage inverter 118 functions as a rectifier converting the AC power into DC power for charging battery modules 124. The power for charging battery modules 124 may come from PV array 104, from AC grid 114, or from both power sources. Storage inverter 118 functions the same regardless of which power source(s) charge battery modules 124. Power may flow through DC/DC buck-boost circuit 120, which steps the voltage down to the appropriate level for charging battery modules 124. The purpose of DC/DC buck-boost circuit 120 is two-fold. One, to the extent necessary, it will buck the rectified DC voltage down to the level of battery modules 124. So, for example, if the rectified DC voltage exceeds battery modules' maximum allowable voltage, which it typically will since both AC grid 114 and string inverter 106 provide at least 170 volts, it will buck that voltage down to a safe level of battery. Second, during discharging of battery modules 124, the battery modules' low voltage is boosted up to a sufficient level for AC conversion to AC grid 114.

During discharge of battery modules 124, power leaving battery modules 124 may again flow through DC/DC buck-boost stage 120 where it is stepped up to grid voltage levels (e.g., 170 volts) before inversion to AC (by DC/AC inverter 122) for supply to AC grid 114 or back-up loads 116. All of these operations (buck and boost), pass through a transformer (indicated in block 124 by "XFMR") located between the battery modules and DC/DC converter 120, and therefore result in non-trivial loss of efficiency.

The amount of boost or buck that occurs will depend on the voltage level of battery pack 102. Therefore, the round-trip efficiency loss of system 100 is almost twice the loss in each direction because the transformer and DC/DC buck-boost 120 are utilized during charging and discharging. Even if there is only 2-5 percent efficiency loss in each direction, when doubled, these losses in kW and kWh become significant over the 10+ year usage life of a storage system with thousands of charge-discharge cycles on the battery pack. As shown in FIG. 1, battery pack 102 also includes a conventional battery management system (BMS) 125. This concept is also applicable in non-PV systems that only have a storage inverter between the battery module and the AC grid.

Figure 2:
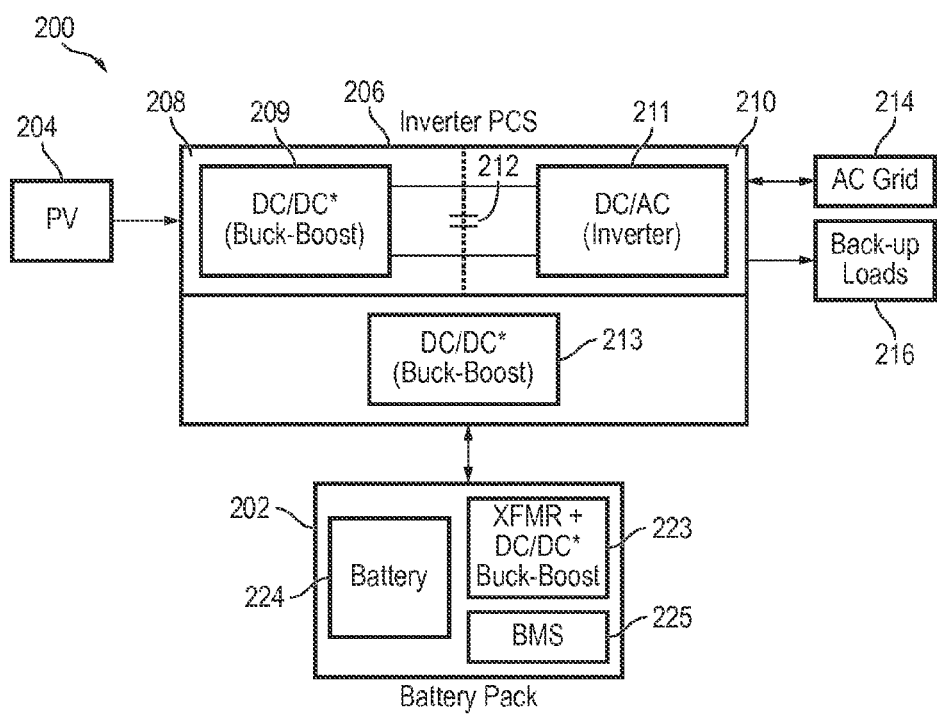
FIG. 2 shows a configuration of an onsite energy generation system with an integrated DC coupled battery pack.

Referring now to FIG. 2, this Figure shows a configuration of onsite energy generation system 200 with an integrated DC coupled battery pack 202. Unlike system 100 in FIG. 1, system 200 is DC coupled and uses an inverter power control system (PCS) 206. Inverter PCS 206 is described in greater detail in U.S. patent application Ser. No. 14/798,069, filed Jul. 13, 2015, as well as U.S. Provisional Patent Application No. 62/151,257, filed Apr. 22, 2015, contents of which are incorporated herein by reference.

Inverter PCS 206 is a two-stage string inverter that shares some common features with the two-stage inverter 106 in FIG. 1. For example, there is a DC/DC boost stage and a DC/AC inversion stage 211 coupled together by a DC-link capacitor bank 212. As with string inverter 106 in FIG. 1, inverter PCS 206 may perform MPPT on the DC input from PV array 204, or, if DC optimizers are used, MPPT may be performed at the PV module level or the N-module level, before reaching inverter PCS 206. However, unlike the typical PV string inverter 106 in FIG. 1, inverter PCS 206 includes a buck-boost circuit or the standard DC/DC boost stage 209 at the DC (PV) input for performing MPPT operation. The inclusion of an asterisk denotes two alternative locations for the buck-boost circuit: either at the DC (PV) input, as shown by block 209, or between the DC link and the output of battery pack 202, as shown by block 213.

Another difference between system 200 and that in FIG. 1 is that unlike system 100 in FIG. 1, in system 200, inverter PCS 206 is a bi-directional inversion stage, so a separate storage inverter, such as storage inverter 118 in FIG. 1, is not necessary. When the PV system is generating energy, that energy can be supplied as DC power directly to battery pack 202 after passing through a buck-boost circuit (block 209 or block 213), or, it can be provided to AC stage 210 for inversion and then provided to AC grid 214 or one or more back-up loads 216. Alternatively, DC/AC inversion stage 211 can rectify AC power from AC grid 214 to supply DC power to battery pack 202 for charging battery modules 224.

In all modes, whether battery pack 202 is being charged by the PV system or charged by AC grid 214, or discharged to back-up loads 216 or to AC grid 214, power flowing to or coming from battery pack 202 must flow through a DC/DC buck-boost circuit to either be stepped down or stepped up to the appropriate voltage level, and also via a transformer (indicated as "XFMR" in block 223) again resulting in efficiency losses. In system 200, the voltage of battery pack 202 may range from 100 to 250 volts or even higher. Note also that battery pack 202 includes its own buck-boost battery protection circuit as shown in block 223. The repetition of buck-boost stages in the battery pack 202 and at the interface with the inverter PCS DC-link may be optimized. As shown in FIG. 2, battery pack 202 also includes a conventional battery management system (BMS) 225.

Figure 3:
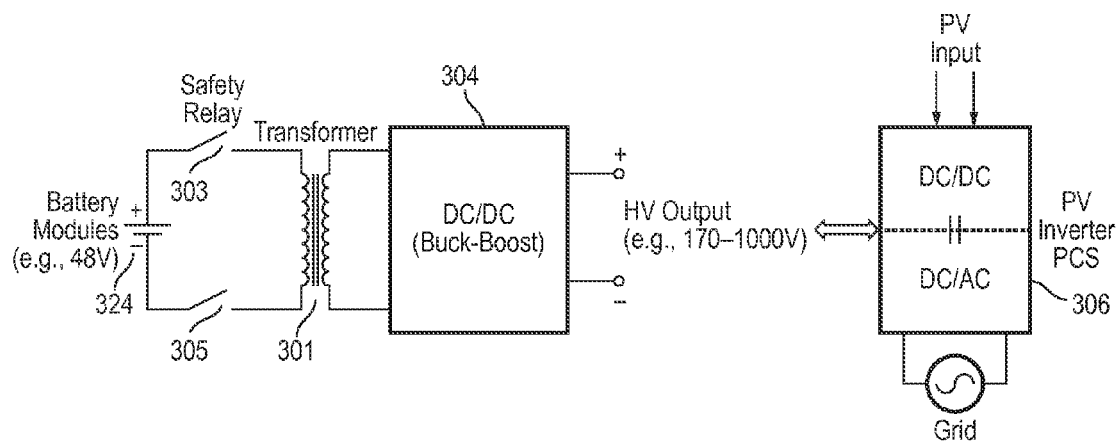
FIG. 3 shows in more detail the connectivity between the battery modules, the transformer and the DC/DC buck-boost converter blocks of FIGS. 1 and 2.

FIG. 3 shows in more detail the connectivity between the battery modules, the transformer and the DC/DC buck-boost converter blocks in the battery packs of FIGS. 1 and 2. As can be seen, battery modules 324 provide a relatively low voltage (e.g., 48V). Battery modules 324 are connected to transformer 301 through safety relays 303, 305. Transformer 301 is in turn connected to DC/DC buck-boost converter 304. In the example shown in FIG. 3, DC/DC buck-boost converter 304 boosts the voltage provided by battery modules 324 to a high voltage, such as 170-1,000V. In a DC-coupled system, such as in FIG. 2, battery modules 324, transformer 301 and DC/DC buck-boost converter 304 may be housed in battery pack 202 (FIG. 2), and the high voltage output of DC/DC buck-boost converter 304 would be coupled to the PV inverter PCS, as shown in FIGS. 2 and 3. In an AC-coupled system, such as in FIG. 1, battery modules 324 and transformer 301 would be housed in battery pack 102 (FIG. 1), DC/DC buck-boost converter 304 would be housed in storage inverter 118 (FIG. 1), and the high voltage output of DC/DC buck-boost converter 304 would be coupled to central capacitor bank 119 (FIG. 1) of storage inverter 118 (FIG. 1).

Regardless of whether the battery pack is used with an AC-coupled system, such as in FIG. 1, or a DC-coupled system, such as in FIG. 2, the battery pack will still be dependent on a DC/DC converter to boost or buck the battery voltage, and a transformer providing galvanic isolation between current/voltage sources and the battery cells to limit the surge energy during abnormal situations such as short circuit between the positive to negative lines or a ground fault between either of positive or negative lines to ground. As a result, when using modern, high voltage batteries with a transformer and a DC/DC buck-boost converter, there are still significant efficiency losses that occur during the charging and discharging processes. Transformers can result in about 3% efficiency loss, and the DC/DC buck-boost converter can result in about 7% efficiency loss. Together, these two stages can result in about 10% efficiency loss.

Figure 4:
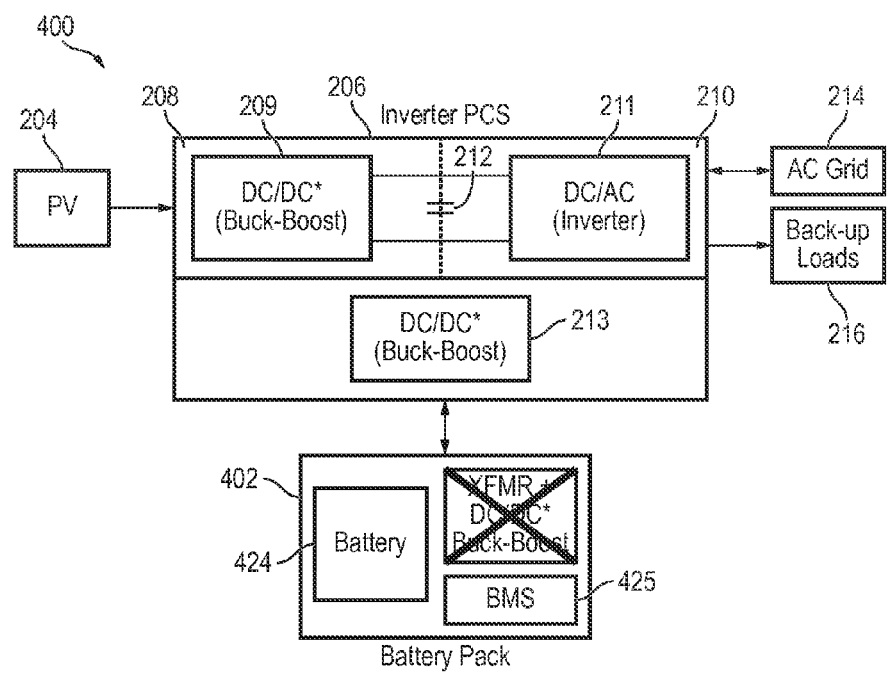
FIGS. 4 and 5 show configurations of onsite energy generation systems that are similar to respective systems in FIGS. 2 and 1 but with improved battery pack and storage inverter designs that substantially reduce efficiency losses, according various embodiments of the invention.
Figure 5:
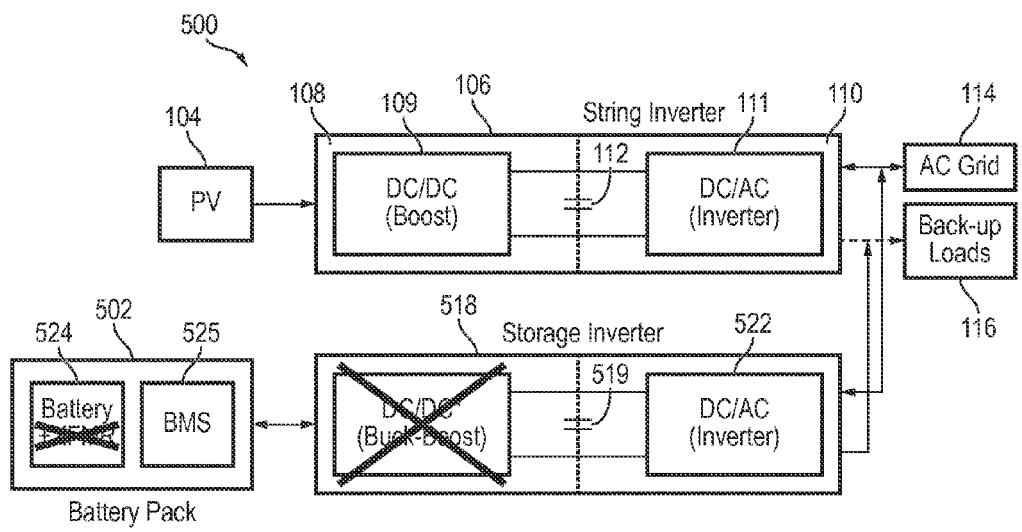

FIGS. 4 and 5 respectively show onsite energy generation systems 400 and 500 that are similar to respective systems 200 (FIG. 2) and 100 (FIG. 1) but with improved battery pack and storage inverter designs that substantially reduce efficiency losses. In system 400 (FIG. 4), as depicted by the crossed out block, the transformer and DC/DC buck-boost circuit internal to battery pack 402 have been eliminated. Similarly, in system 500 (FIG. 5), the transformer inside battery pack 502 as well as the DC/DC buck-boost in storage inverter 518 have been eliminated. In this manner, the positive and negative output terminals of the high-voltage battery packs in FIGS. 4 and 5 are directly connected to the AC stage of the respective systems without intervening transformer and/or DC/DC buck-boost converter blocks. By eliminating the transformer and DC/DC buck-boost blocks, the efficiency losses associated with these blocks are eliminated.

Battery modules 424 (FIG. 4) and 524 (FIG. 5) may be high-voltage batteries in the range of 400-500V, and in some applications, may even be up to 800-1000V or lower from 170V depending on the AC Grid interconnection voltage. The specific battery technology utilized in battery packs 402 and 502 is not critical to the invention. Any contemporary high voltage battery technology will comply, or even future battery technology. Using a high-voltage battery directly, eliminates the need to step-up the battery voltage when discharging the battery, however, because battery packs 402 and 502 no longer have the protection of galvanic isolation provided by an internal transformer, a different approach is required for over-current or surge-current protection. In various embodiments, this is accomplished with one or more high-speed switches connected between the battery pack's positive and negative output terminals and its internal battery modules. The high-speed switches may be commercially available high-speed relays or solid-state power electronic switches such as MOSFETs and IGBTs, or a combination of high-speed relays and solid-state power switches for redundancy. These high-speed switches are activated in response to an over-current or a surge-current detected by high-speed current sensors that are connected to the positive and/or negative lines of the battery modules. When the high-speed current sensors detect an over-current or a surge-current, indicating a fault condition (e.g., single line or double line fault), a controller coupled to the high-speed sensors and the high-speed switches causes the switches to be temporarily opened to protect the battery for the duration of the fault/abnormal condition. An over-current refers to an abnormal condition where the detected current is greater than the acceptable operating current. An over-current is typically a certain percentage over the acceptable operating current. For example, where the maximum operating current is 20 A, an over-current could be as small as 40 A (200%) or 60 A (300%) for a milli-second duration. A surge current refers to a super high current that can be as high 1 kA (50×), 10 kA (500×) or even greater for a microsecond duration. Both over-current and surge-current conditions are covered under fault conditions. A single line fault condition occurs where a surge current flows between either the positive terminal or the negative terminal of the battery modules and the system ground. A double line fault condition occurs when a surge current flows between the positive and negative terminals of the battery modules. The high-speed sensors need to be capable of operating at such high speeds so as to enable triggering fault protection within the milliseconds or microseconds timescale (e.g., within 100 microsecond) of occurrence of a fault condition.

Figure 6:
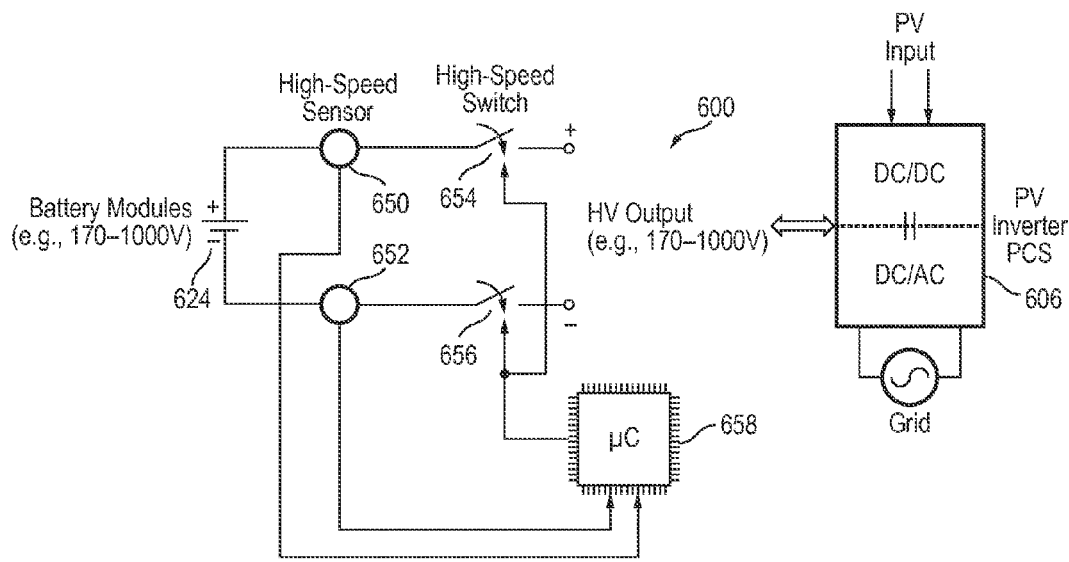
FIG. 6 shows a circuit implementation of a high voltage battery pack, in accordance with various embodiments of the invention.

FIG. 6 shows an implementation of the above technique, in accordance with various embodiments. FIG. 6 shows a battery pack 600 with high voltage battery modules 624 that provide a high voltage, e.g., in the range of 170V-1000V DC. This battery voltage range corresponds to the AC voltage range of 120V-690V AC (single-phase or three-phase), which covers both residential and commercial applications. Each battery module (not shown) in battery modules 624 can include multiple battery cells. The battery modules and their battery cells can be connected in series and/or parallel to provide the requisite battery voltage and current. In FIG. 6, high-speed current sensor 650 is connected between high-speed switch 654 and the positive terminal of battery modules 624. High-speed current sensor 652 is connected between high-speed switch 656 and the negative terminal of battery modules 624. High-speed switch 654 is connected between high-speed sensor 650 and the positive output terminal of battery pack 600, and high-speed switch 656 is connected between high-speed sensor 652 and the negative output terminal of battery pack 600. Battery pack 600 also includes control circuit 658 connected to receive output signals provided by high-speed current sensors 650 and 652, and in response generate control signals that are coupled to control high-speed switches 654 and 656. In various embodiments, control circuit 658 may be a conventional microcontroller capable of operating at high-speeds.

In operation, when one or more of high-speed current sensors 650 and 652 detect a fault condition (e.g., single or double fault), the one or more high-speed current sensors send an appropriate signal to controller block 658. In response to the signal(s) from the high-speed current sensors, controller block 658 generates control signals that cause high-speed switches 654 and 656 to temporarily open in order to protect battery modules 624. After the fault is cleared, the current sensors send appropriate signal(s) to control block 658, which in response causes the high-speed switches to close so that power can flow to and from battery modules 624 and the inverter. In various embodiments, current sensors 650 and 652 are capable of operating at high enough speeds so that fault protection triggers within milli-seconds or micro-seconds of a detected fault condition. Current sensors 650 and 650 need to be able to detect over-current and surge-currents (high amplitudes) instantly. In various embodiments, current sensors that have operating frequency bandwidth of 100 kHz or greater would be sufficient. Also, high-speed relays based on gas operation and/or power MOSFETs or IGBTs that can operate at high switching frequencies, for example, in the range of 100 kHz to 1 MHz, would be sufficient. Power MOSFETs or IGBTs based on advanced silicon (Si), silicon carbide (SiC), or Gallium Nitride (GaN) would be suitable.

When battery pack 600 is used in a DC-coupled system, such as in FIG. 4, the high voltage output of battery pack 600 would be coupled to the PV inverter PCS, as shown in FIGS. 4 and 6. In an AC-coupled system, such as in FIG. 5, the high voltage output of battery pack 600 would be coupled to central capacitor bank 519 (FIG. 5) of storage inverter 518 (FIG. 5). In this manner, the high voltage positive and negative output terminals of battery pack 600 are directly connected to the AC stage of the respective systems without intervening transformer and/or DC/DC buck-boost converter blocks. By eliminating the transformer and/or DC/DC buck-boost blocks (i.e., blocks 301 and 304 in FIG. 3), the efficiency losses associated with these blocks are eliminated.

Figure 7:
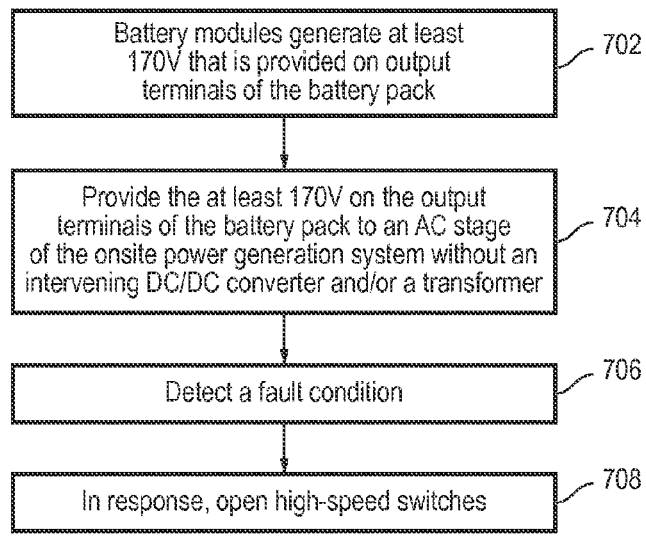
FIG. 7 is a flow diagram showing the operational steps of the high voltage battery pack shown in FIG. 6.

FIG. 7 is a flow diagram showing the operational steps of battery pack 600 in FIG. 6. At step 702, a voltage of at least 170V generated by battery modules is provided on the output terminals of the battery pack. At step 704, the at least 170V on the output terminals of the battery pack is provided to an AC stage of the onsite power generation system without an intervening DC/DC converter and/or a transformer. At step 706 a fault condition is detected in the battery pack. At step 708, in response to the detected fault condition, high-speed switches are opened to electrically isolate the battery modules from the output terminals of the battery pack.

Figure 8:
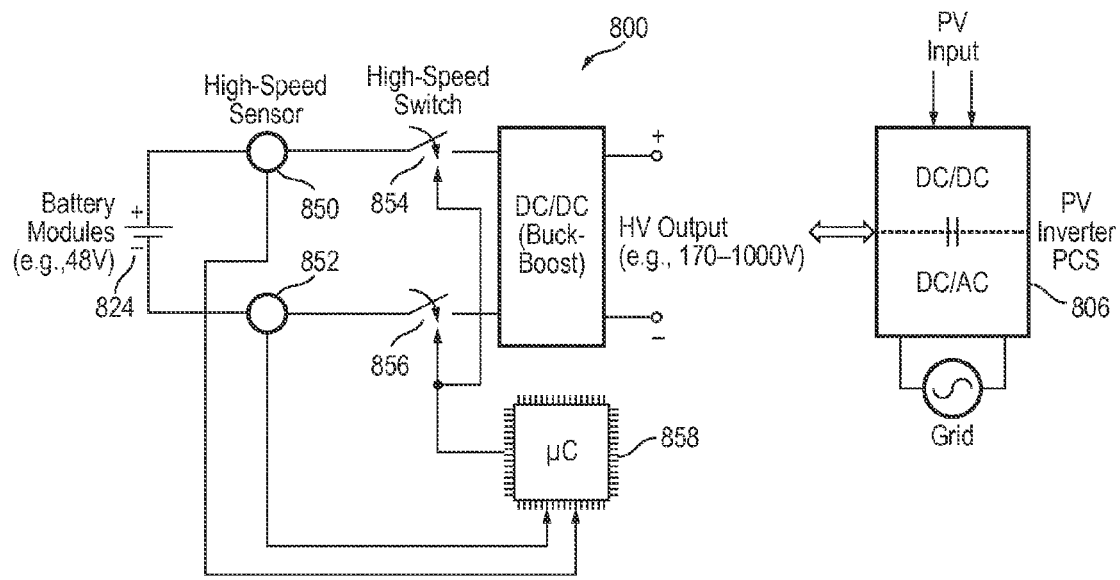
FIG. 8 shows a circuit implementation of a high voltage battery pack, in accordance with various embodiments of the invention.

While in the FIG. 6 embodiment, both the transformer and the DC/DC buck-boost converter are removed, in applications with low voltage battery modules (e.g., 48V), the DC/DC buck-boost converter may be incorporated to enable bucking and boosting of the voltage. FIG. 8 shows an implementation of such embodiment. The FIG. 8 implementation is similar to that in FIG. 6 except DC/DC buck-boost converter 860 is incorporated between high-speed switches 854, 856 and the high voltage output terminals of battery pack 800. While some efficiency loss is incurred due to DC/DC buck-boost converter 860, this embodiment has improved efficiency and lower cost compared to battery packs that include a transformer. FIG. 8 shows use of battery pack 800 in a DC-coupled system (i.e., output terminals of battery pack 800 are connected to PV inverter PCS 806). In an AC-coupled system, such as in FIG. 5, DC/DC buck-boost converter 860 may be incorporate in storage inverter 518 (FIG. 5) rather than in the battery pack.

Figure 9:
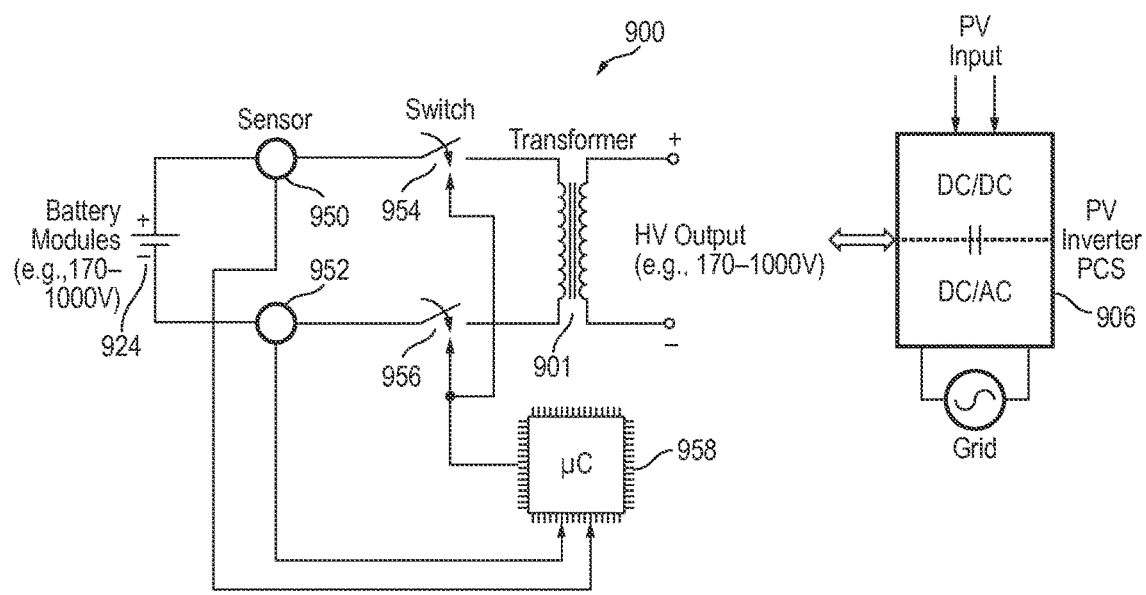
FIG. 9 shows a circuit implementation of a battery pack, in accordance with various other embodiments of the invention.

FIG. 9 shows another implementation of the battery pack that is similar to that in FIG. 6 except transformer 901 is incorporated between switches 954, 956 and the high voltage output terminals of battery pack 900. While some efficiency loss is incurred due to transformer 901, this embodiment still has improved efficiency and lower cost compared to battery packs that include a DC/DC buck-boost converter. FIG. 9 shows use of battery pack 900 in a DC-coupled system (i.e., output terminals of battery pack 900 are connected to PV inverter PCS 906). In an AC-coupled system, such as in FIG. 5, the high voltage output of battery pack 900 would be coupled to central capacitor bank 519 (FIG. 5) of storage inverter 518 (FIG. 5). In this manner, the high voltage positive and negative output terminals of battery pack 900 are directly connected to the AC stage of the AC-coupled and DC-coupled systems without an intervening DC/DC buck-boost converter. In some variations, current sensors 950, 952 and switches 954, 956 need not be high speed since transformer 901 is present.

It is noted that while the embodiments in FIGS. 6, 8 and 9 show the current sensors being connected between the battery modules and the switches, the position of the current sensors and switches can be reversed without impacting the operation of the battery pack.

In various embodiments, it may be desirable to include a fire detection and/or fire suppression system in the battery pack in the event of a failure of the high-speed switches or current sensors. As an alternative, or in addition to, it may be desirable to include one or more arc-flash detection devices in the battery pack isolating the positive and negative lines between the battery terminals on the battery pack and the battery modules within the battery pack. These devices will automatically trip when they detect a flashing arc above certain intensity levels.

The embodiments of the present inventions are not to be limited in scope by the specific embodiments described herein. For example, although many of the embodiments of the battery pack disclosed herein have been described in the context of particular onsite PV systems, the efficiency improvements associated with the battery pack may be realized in other types of onsite power generation systems (e.g., wind, backup systems). Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breath and spirit of the embodiments of the present inventions as disclosed herein.

What is claimed is:

1. A high-voltage battery pack for an onsite power generation system, comprising:
    positive and negative output terminals;
    battery modules configured to provide a voltage of at least 170V;
    a high-speed current detection circuit and high-speed switches serially coupled between the battery modules and the positive and negative output terminals of the high-voltage battery pack; and
    a control circuit operatively coupled to the high-speed current detection circuit and the high-speed switches so that when the high-speed current detection circuit detects a fault condition, the control circuit opens one or more of the high-speed switches to thereby electrically isolate the battery modules from one or both of the positive and negative output terminals of the high-voltage battery pack,
    wherein the high-voltage battery pack is configured so that the at least 170V provided by the battery modules is provided to an AC stage of the onsite power generation system without an intervening DC/DC converter.

2. The high-voltage battery pack of claim 1 wherein the high-voltage battery pack is further configured so that the at least 170V provided by the battery modules is provided to an AC stage of the onsite power generation system without an intervening transformer.

3. The high-voltage battery pack of claim 1 further comprising a transformer coupled between the positive and negative output terminals of the high-speed voltage battery pack and the serially coupled high-speed current detection circuit and high-speed switches.

4. The high-voltage battery pack of claim 1 wherein the high-speed current detection circuit includes first and second high-speed current sensors, and the high-speed switches include first and second high-speed switches, the first high-speed current sensor being coupled between the first high-speed switch and a positive terminal of the battery modules, and the second high-speed current sensor being coupled between the second high-speed switch and a negative terminal of the battery modules.

5. The high-voltage battery pack of claim 1 wherein the high-speed current detection circuit includes first and second high-speed current sensors, and the high-speed switches include first and second high-speed switches, the first current sensor being coupled between the first high-speed switch and the positive output terminal of the battery pack, and the second high-speed current sensor being coupled between the second high-speed switch and a negative output terminal of the battery pack.

6. The high-voltage battery pack of claim 1 wherein the control circuit includes a microcontroller configured to generate one or more output signals in response to one or more output signals generated by the high-speed current detection circuit, the one or more output signals generated by the microcontroller being coupled to control the high-speed switches.

7. The high-voltage battery pack of claim 1 wherein, the high-speed current detection circuit is configured to detect a single line fault or a double line fault.

8. The high-voltage battery pack of claim 1 wherein, the high-speed switches comprise high-speed relays capable of operating at 100 kHz or greater.

9. The high-voltage battery pack of claim 1 wherein, the high-speed switches comprise solid state power transistors capable of operating at 100 kHz or greater.

10. The high-voltage battery pack of claim 1 further comprising an arc flash detector configured to detect flashing arc.

11. The high-voltage battery pack of claim 1 further comprising a fire suppression system.

12. A method of operating a high-voltage battery pack for an onsite power generation system, the method comprising:
providing a voltage of at least 170V generated by battery modules on output terminals of the battery pack;
providing the at least 170V on the output terminals of the battery pack to an AC stage of the onsite power generation system without an intervening DC/DC converter;
detecting a fault condition in the battery pack; and
in response to the detected fault condition, opening high-speed switches to electrically isolate the battery modules from the output terminals of the battery pack.

13. The method of claim 12 wherein the fault condition is detected by a high-speed current sensor that is coupled to a controller, the method further comprising:
generating, at an output of the high-speed current sensor, a fault signal in response to the detected fault condition;
receiving, at an input of the controller, the fault signal;
generating a control signal at an output of the controller in response to the fault signal; and
receiving, at an input of one of the high-speed switches, the control signal.

14. The method of claim 12 further comprising providing the at least 170V on the output terminals of the battery pack to an AC stage of the onsite power generation system without an intervening transformer.

15. The method of claim 12 wherein the at least 170V generated by the plurality of modules is provided on the output terminals of the battery pack through a transformer.

16. An onsite energy storage system comprising:
battery modules;
a high-speed current detection circuit;
high-speed switches;
a DC/DC buck-boost converter, wherein the high-speed current detection circuit and the high-speed switches are serially coupled between the battery modules and the DC/DC buck-boost converter, the output of the buck-boost converter providing positive and negative output terminals of the onsite energy storage system; and
a control circuit operatively coupled to the high-speed current detection circuit and the high-speed switches so that when the high-speed current detection circuit detects a fault condition, the control circuit opens one or more of the high-speed switches to thereby electrically isolate the battery modules from one or both of the positive and negative output terminals of the onsite energy storage system,
wherein the onsite energy storage system is configured so that a voltage provided by the battery modules boosted by the DC/DC buck-boost converter is provided to an AC stage of an onsite power generation system without an intervening transformer.

17. The onsite energy storage system of claim 16 wherein the high-speed current detection circuit includes first and second current sensors, and the high-speed switches include first and second switches, the first current sensor being coupled between the first switch and a positive terminal of the battery modules, and the second current sensor being coupled between the second switch and a negative terminal of the battery modules.

18. The onsite energy storage system of claim 16 wherein the high-speed current detection circuit includes first and second current sensors, and the high-speed switches include first and second switches, the first current sensor being coupled between the first switch and the positive output terminal of the battery pack, and the second current sensor being coupled between the second switch and a negative output terminal of the battery pack.

19. The onsite energy storage of claim 16 wherein the control circuit includes a microcontroller configured to generate one or more output signals in response to one or more output signals generated by the high-speed current detection circuit, the one or more output signals generated by the microcontroller being coupled to control the high-speed switches.

20. The onsite energy storage system of claim 16 further comprising an arc flash detector configured to detect flashing arc.

* * * * *